UNITED STATES PATENT OFFICE.

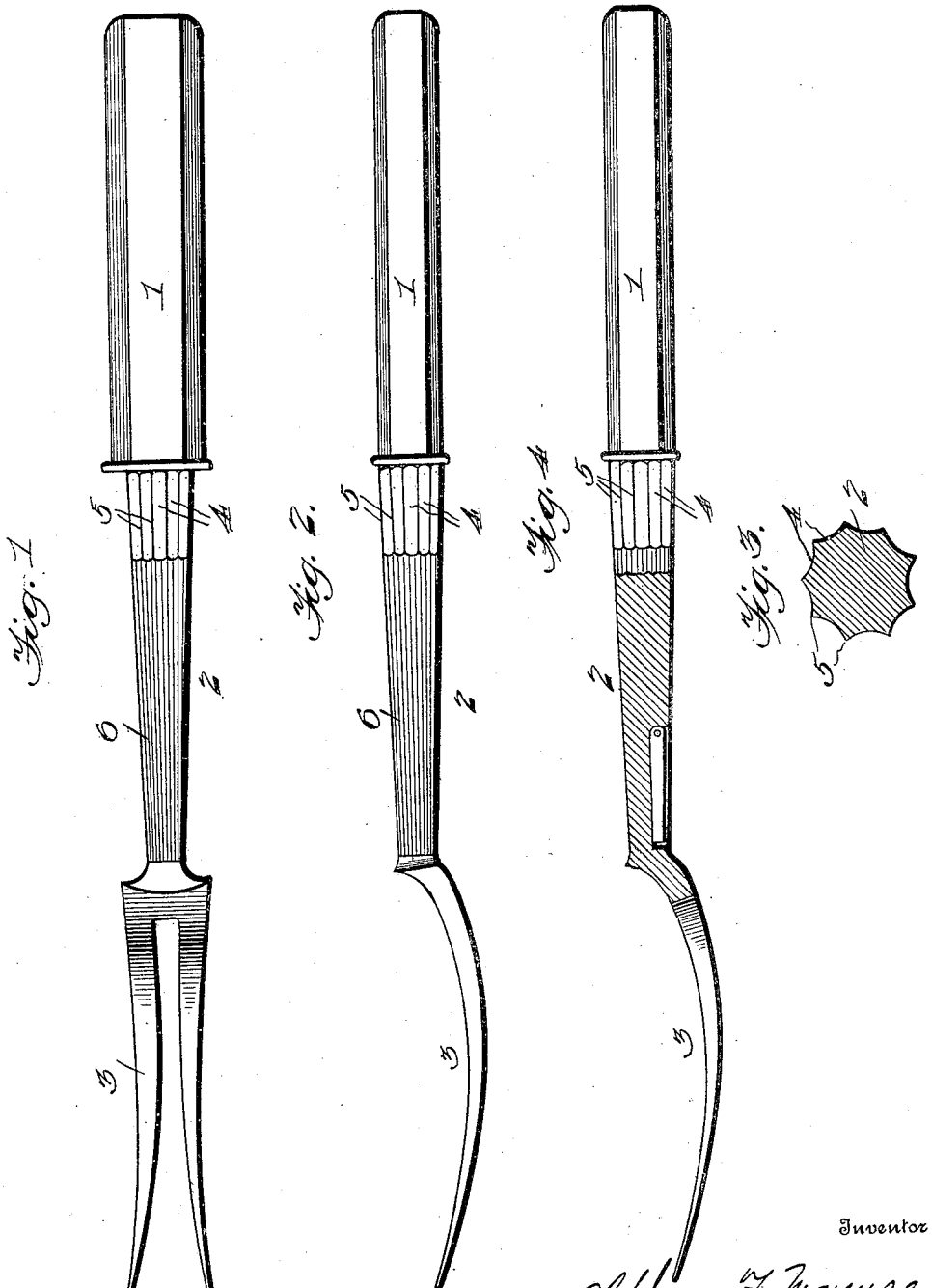

ALPHONSE F. MONEUSE, OF NEW ROCHELLE, NEW YORK.

KNIFE-SHARPENING TOOL.

No. 917,472.  Specification of Letters Patent.  Patented April 6, 1909.

Application filed May 16, 1906, Serial No. 317,149.  Renewed December 28, 1908.  Serial No. 469,658.

*To all whom it may concern:*

Be it known that I, ALPHONSE F. MONEUSE, citizen of the United States, residing at New Rochelle, in the county of Westchester and State of New York, have invented certain new and useful Improvements in Knife-Sharpening Tools, of which the following is a specification.

This invention relates to new and useful improvements in knife sharpening tools.

I have preferred to show the tool as forming the shank of a carving fork for the reason that when the tool is used in this combination, a simple, durable and useful implement is provided, in the way of a sharpening device that does away with the expense incident to the provision of a steel with each carving set, and which expedites the carving operation, making it more convenient for the carver, in that fewer operations are necessary to accomplish the object. The knife is simply sharpened upon the shank of the fork, when the carver may proceed with the use of the knife, without having, as in the old way, to put down the steel and take up the knife before proceeding.

The invention contemplates the provision of a tool, the shank of which is provided with a finishing portion, or a portion upon which the final strokes are made and a shorter coarser portion intended for the purpose of initial sharpening.

I desire it understood at the outset, that while I have shown the tool as forming the shank of a fork, with which tool or implement it is especially useful, the tines of the fork may be omitted.

In the drawings illustrating the invention; Figure 1 is a top plan view of a fork constructed in accordance with my invention; Fig. 2 is a side or edge elevation of the fork; Fig. 3 is a transverse section of the shank through that portion thereof formed for the first operation in the sharpening of the knife; and Fig. 4 is a longitudinal sectional view of a modified form of fork, showing the manner in which a guard may be set into the shank or "steel" portion of the fork.

Referring to the drawings, the numeral 1 represents the handle of the fork, to which in carrying out my invention, I attach in any usual or well known manner, an elongated shank 2, to the end of which, and integral therewith are the usual fork tines 3. The shank is provided near the handle with a series of concavities 4, with their edges coinciding to form sharp edges 5, or this portion of the shank may be described as being fluted. It is for the purpose of sharpening the knife, or rather for the first operation in sharpening, and preparing it for the final operation or finishing.

The numeral 6 designates the finishing portion of the shank which begins where the fluted portion leaves off, and extends toward the tines of the fork where it ends at a suitable point. This portion of the shank may correspond in every particular, so far as exterior formation is concerned, with a steel of ordinary construction, that is to say, it may be provided with a series of fine parallel or substantially parallel grooves presenting fine sharp edges, or it may be grooved spirally in opposite directions, or checkered, or in fact shaped in any way best adapted for taking hold of the steel of the knife in removing a portion of its edge or shaping the same from a rough condition to a smooth state, suitable for cutting.

Referring particularly to Fig. 4, it will be seen that the shank is provided with a recess in which the guard rests, and that the upper surface of the guard when not in use or in raised position, is flush with the surface of the shank. This guard is of usual construction, and may be pivoted to the shank as shown.

Claims.

1. A knife sharpening tool having a shank provided throughout a portion of its length with a series of substantially parallel grooves, whose edges concide, producing between each pair of grooves a sharp edge adapted for the first operation in sharpening in either direction and another finer roughened portion running gradually into the edges of the coarser portion, so in the sharpening operation, a knife may pass gradually from one surface of the shank to the other and be sharpened and finished in the same operation.

2. A knife sharpening tool having a shank provided throughout a portion of its length with a series of substantially parallel concave grooves, whose edges coincide to produce between each pair of grooves a sharp edge adapted for the first operation in sharpening in either direction, and a finer finishing surface running gradually into the edges of said grooves, so that in the sharpening operation, the knife may pass gradually from one surface to the other, and be sharpened and finished in the same operation and a suitable handle for said tool.

In testimony whereof I affix my signature in presence of two witnesses.

ALPHONSE F. MONEUSE.

Witnesses:
 Joshua Rose,
 Daniel F. Snover.